US008460139B2

(12) United States Patent
Parks

(10) Patent No.: US 8,460,139 B2
(45) Date of Patent: Jun. 11, 2013

(54) BELT INSTALLATION GUIDES

(75) Inventor: Bruce J. Parks, Bloomfield, NY (US)

(73) Assignee: Xerox Corporation, Norwalk ( * ) Notice: Subject to any disclaimer, the term of this patent is extended or adjusted under 35 U.S.C. 154(b) by 1335 days.

(21) Appl. No.: 11/895,864

(22) Filed: Aug. 28, 2007

(65) Prior Publication Data

US 2009/0062047 A1 Mar. 5, 2009

(51) Int. Cl.
*F16H 7/22* (2006.01)

(52) U.S. Cl.
USPC ............. 474/130; 474/84; 474/111; 474/137; 198/860.1; 198/813; 198/832; 198/841; 399/116; 399/121; 399/122

(58) Field of Classification Search
USPC .................. 474/130, 111, 131–141; 198/813, 198/860.1, 861.1; 271/198; 399/116, 121
See application file for complete search history.

(56) References Cited

U.S. PATENT DOCUMENTS

| | | | | |
|---|---|---|---|---|
| 1,169,565 | A * | 1/1916 | Pepper | 474/130 |
| 2003/0152400 | A1 * | 8/2003 | Maier et al. | 399/121 |
| 2003/0231898 | A1 * | 12/2003 | Asaoka et al. | 399/116 |

* cited by examiner

*Primary Examiner* — Robert A Siconolfi
*Assistant Examiner* — San Aung
(74) *Attorney, Agent, or Firm* — Ronald E. Prass, Jr.; Prass LLP

(57) ABSTRACT

A belt installation guide is disclosed which accommodates the loading in a belt module of a new belt around drive rollers. The guide is placed opposite the end portions of the rollers, the belt is slipped over the guides and held by the guides until the belt is pushed over the rollers. The guides can be attached to the belt module or can be detachable therefrom. Once in place over the rollers, a tension is exerted on the belt to make it taut over all of the rollers. The guide is removed from near the rollers after the belt is in place over the rollers.

9 Claims, 8 Drawing Sheets

FIG. 5
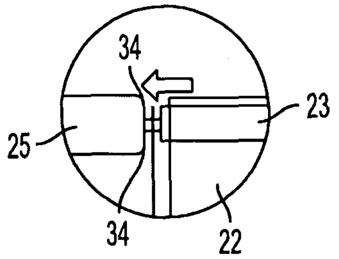
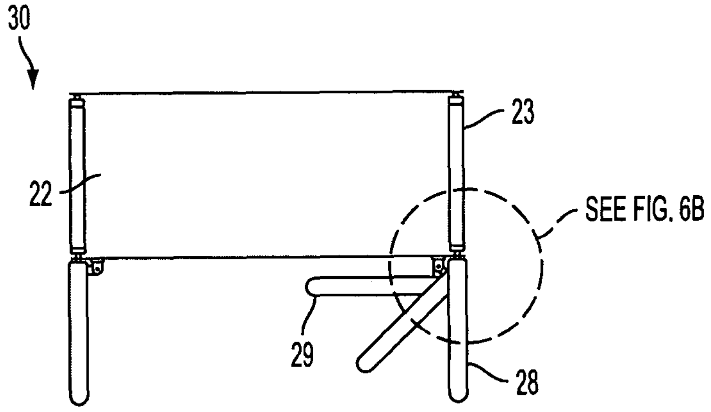
FIG. 6A
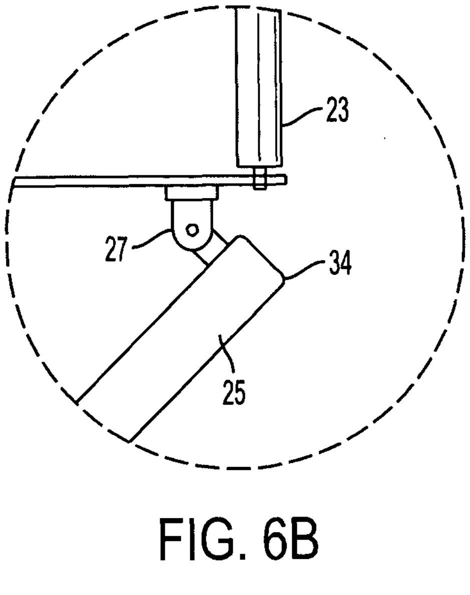
FIG. 6B

BELT INSTALLATION GUIDES

CROSS REFERENCES TO A RELATED APPLICATION

Illustrated and disclosed in a co-pending application, U.S. Pat. No. 11/895,863 owned by the present assignee, is an application relating to an internally-housed guide. This guide of ID U.S. Pat. No. 11/895,863 may be movably located in a belt roller or in a housing adjacent a roller. The application based on U.S. Pat. No. 11/895,863 is filed in the U.S. Patent and Trademark Office on the same date as the present application, U.S. Pat. No. 11/895,864. The disclosure of U.S. Pat. No. 11/895,863 is totally incorporated herein by reference.

This invention relates to belt comprising systems and, more specifically, to a guide used to change belts in these systems.

BACKGROUND

While the present invention of belt installation guides can be effectively used in a plurality of different belt configurations, it will be described for clarity as used in electrostatic marking systems such as electrophotography.

By way of background, in marking systems such as Xerography or other electrostatographic processes, a uniform electrostatic charge is placed upon a photoreceptor belt or drum surface. The charged surface is then exposed to a light image of an original to selectively dissipate the charge to form a latent electrostatic image of the original. The latent image is developed by depositing finely divided and charged particles of toner upon the belt or drum photoreceptor surface. The toner may be in dry powder form or suspended in a liquid carrier. The charged toner, being electrostatically attached to the latent electrostatic image areas, creates a visible replica of the original. The developed image is then usually transferred from the photoreceptor surface to a final support material such as paper and the toner image is fixed thereto to form a permanent record corresponding to the original.

In these electrostatic marking systems, a photoreceptor belt or drum surface is generally arranged to move in an endless path through the various processing stations of the Xerographic process. Sometimes, as noted, the photoreceptor or photoconductor surface is in the form of an endless belt and in other systems it is in the form of a drum. In this endless path, several Xerographic-related stations are traversed by the photoconductive belt or drum, becomes worn and in several of these stations various belt configurations in addition to photosensitive belts are used such as transfer belts, pre-fuser transport belts, intermediate transfer belts and the like. Each of these belts is exposed to friction and moved by rollers that provide the belt movement to accomplish the belt purpose. After a while, the belt needs to be replaced. Since the photoreceptor surface is reusable when the toner image is transferred to a final support material such as paper, the surface of the photoreceptor is constantly abraded and cleaned by a blade and/or brushes and prepared to be used once again in the marking process.

Image-carrying belts used in color printing processes can be especially difficult to replace and install. In some machines, the horizontal intermediate transfer belt is over 6-10 feet long. Belt installation requires careful alignment with the belt module to prevent belt damage. At even longer belt lengths, the replacement operation is extremely difficult to install without belt damage occurring.

Even in monochromatic marking systems that use shorter belts for various functions, extreme care must be taken not to damage the belts during installation. In some instances, the belts are constructed of thin flexible polymeric materials that can easily scratch or be damaged during belt replacement or even during original installation.

SUMMARY

Embodiments of belt installation guides of this invention in marking systems provide belt alignment during the installation process with a minimum of belt damage. The guides in one embodiment are movably attached to the belt module and are swung into position during belt installation and pivoted closed when not in use. In a second embodiment, the guides are removable from the belt module after use in installing a new belt. These embodiments will be further described in reference to the drawings of this disclosure. As colors are added to the marking systems, belts get longer and the need for guides will be more important. Guides that are built into the belt module save time compared to detachable guides though detachable guides of this invention save space inside the machine. Thus, there are advantages to both attached and detachable guides. The scope of this invention includes both these integrated and detachable guides.

The embodiments herein provide belt guides that could be mounted on the belt modules of products that have long transfer belts, especially those in excess of 10 feet in overall length. The installation of long belts is difficult due to their size and scope; therefore, the installation requires care because of the likelihood of damage. It is especially difficult in applications that have the transfer belt module mounted horizontally. The invention in one embodiment provides the incorporation of guides into the belt housing. The invention focuses on hinged guides but includes detachable ones if spacing becomes an issue. The guides would protrude toward the front of the machine from the housing at two or more roller positions providing a pre-staging area for the belt. The belt would then be draped in a position close to the actual belt housing but without the clearance issues. The belt would then be manually tensioned as it is slid over the belt module. After installation, the guides would be removed or pivoted back into their inactive positions. These guides can also be used for removal of the belt but belt damage is not as great an issue then. An alternative to internal installation is to mount the belt module on rails so that it can be moved out of the machine for easy belt mounting using the present invention.

The embodiments of the present invention, as earlier noted, can be used to replace any belt in any type system. For clarity, these embodiments will be described in relationship to a marking system both color and monochromatic. The belts can be of any construction and use such as photosensitive belts, insulating belts, transfer belts, cleaning belts and mixtures thereof.

BRIEF DESCRIPTION OF THE DRAWINGS

FIGS. 4A, 4C, 4E, 4G are front views and FIGS. 4B, 4D, 4F, 4H are side views of the installation steps.

FIG. 5 illustrates a belt removal step rather than installation step, using the belt installation guides of this invention.

FIGS. 6A and 6B illustrate a top view of an attached embodiment of the belt installation guides of this invention.

DETAILED DISCUSSION OF DRAWINGS AND PREFERRED EMBODIMENTS

Figure 1:
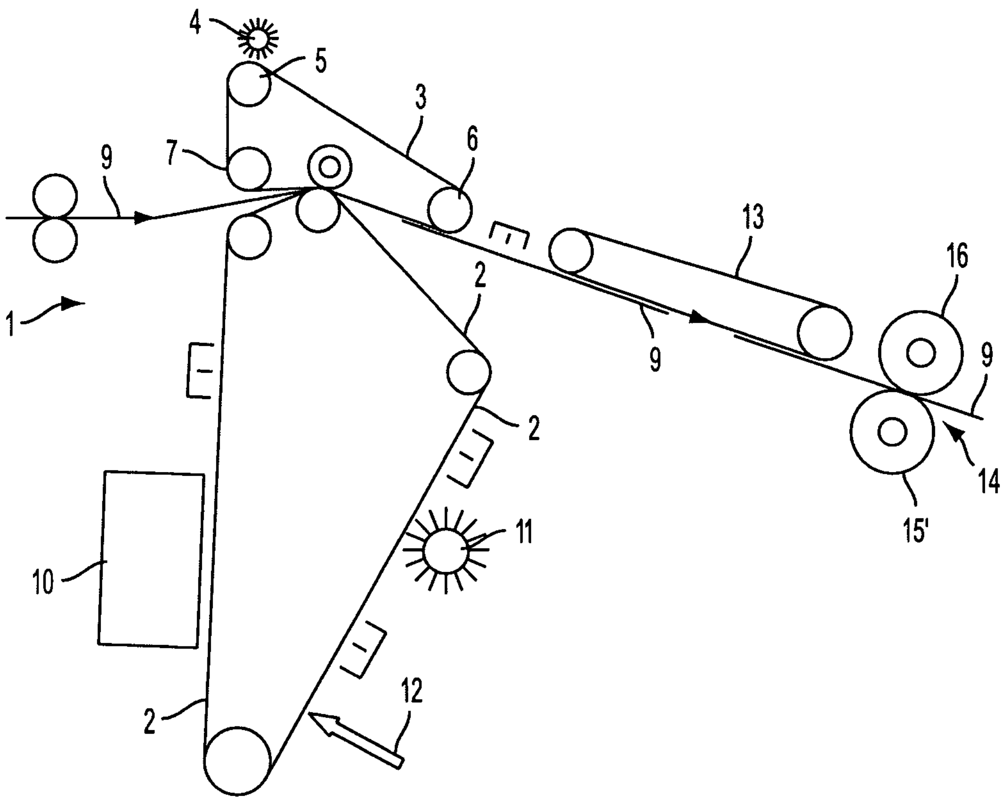
FIG. 1 is a typical monochromatic marking system using belts for various purposes.

In FIG. 1, a complete electrostatic marking system 1 using different belts and rollers is illustrated having a photoconductive belt 2, a transfer belt 3, a transfer belt cleaning brush 4, transfer belt rollers 5, 6 and 7 upon which the transfer belt 3 travels. The transfer belt cleaner brush 4 is positioned over conductive grounded roller 5 where transfer belt 3 passes. A paper or paper path 9 is designated where the paper is transported between transfer belt 3 and photoconductor belt 2. A developer housing 10, a photoconductor cleaning brush 11 and exposure station 12 are shown. A pre-fuser transport belt 13 is depicted as it provides means for transport of the paper 9 to the fuser station 14. Fuser station 14 is made up of a fuser roll 15 and a pressure roll 16. Each of belts 2, 3 and 13 can be replaced using the belt guides of this invention.

Figure 2:
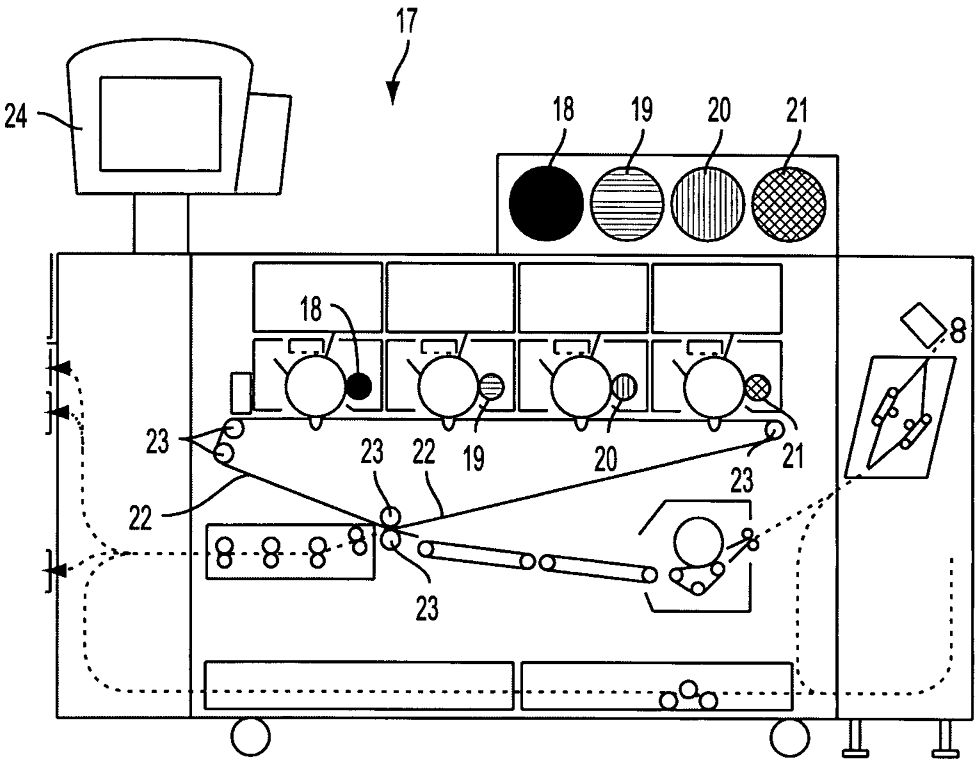
FIGS. 2 and 3 illustrate a color system using an intermediate transfer belt between color stations.

In FIG. 2, a front view of a color marking system 17 is illustrated having four color marking stations, a black marking station 18, a cyan marking station 19, a magenta marking station 20 and a yellow marking station 21. Traveling through each of these marking stations is an intermediate transfer belt 22 that travels around belt rollers 23. This FIG. 2 and FIG. 3 illustrate the type of belt-roller color systems that can use the belt installation guides of this invention.

Figure 3:
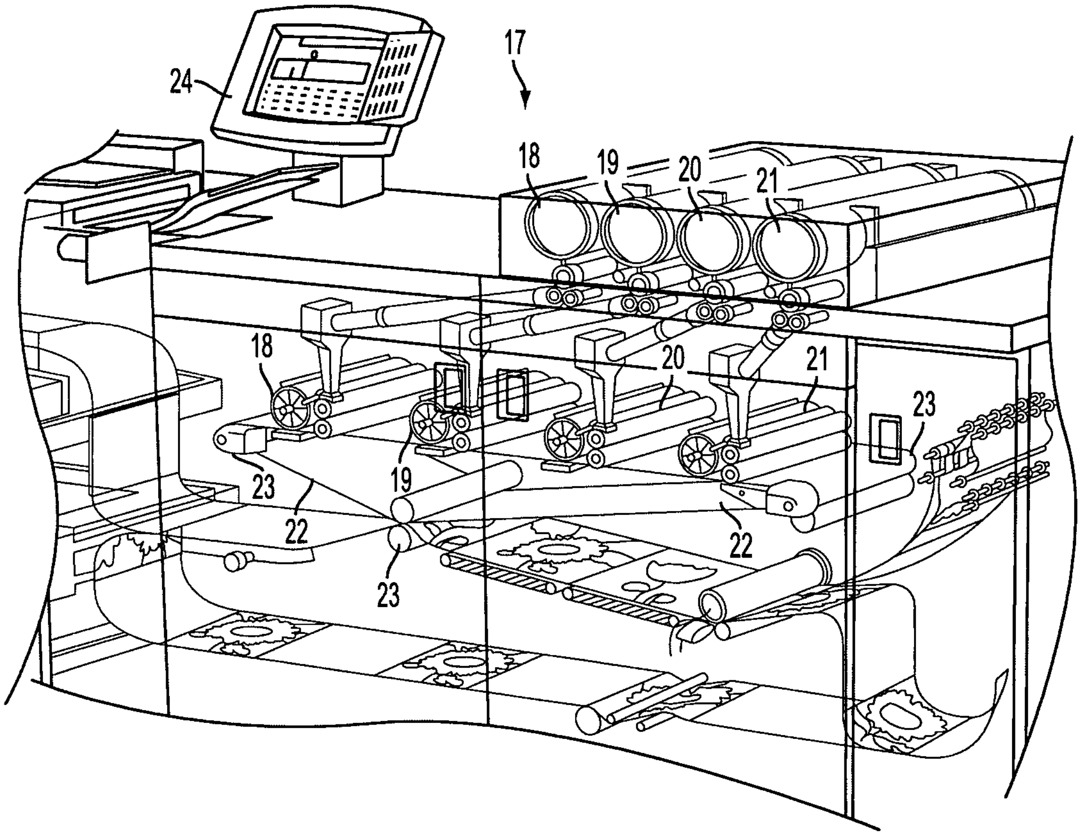

In FIG. 3, a perspective view of the FIG. 2 color marking system is illustrated having a control panel 24 and marking or coloring stations. Traveling through these marking stations is an intermediate transfer belt 22 having rollers 23 around which belt 22 travels. At least one of these rollers 23 is powered to move belt 22. The other components of color system 17 are unimportant as they relate to the present invention. Belt 22 can be lengthy and difficult to replace, however the use of the belt installation guides of this invention provides an easy, convenient and safe way to replace this belt 22.

Thus, FIG. 1 illustrates a monochrome marking system where the installation guides shown in FIG. 4 can be used. FIGS. 2 and 3 illustrate a more complex color system where the installation guides of this invention can be used to replace intermediate belt 22.

Figure 4A:
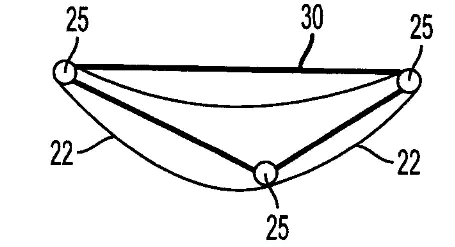
FIGS. 4A-4H show an embodiment illustrating the belt installation steps using the belt installation guides of this invention.
Figure 4B:
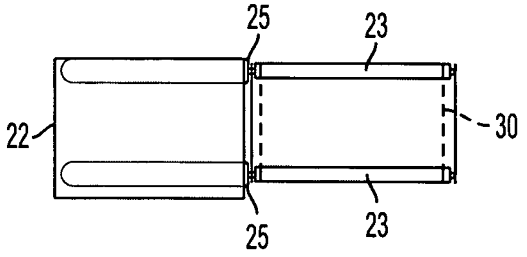
Figure 4C:
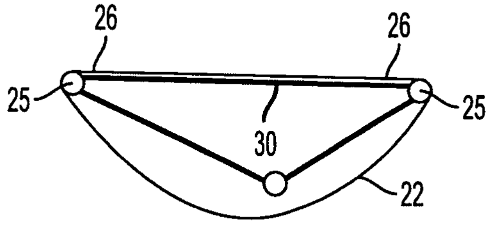
Figure 4D:
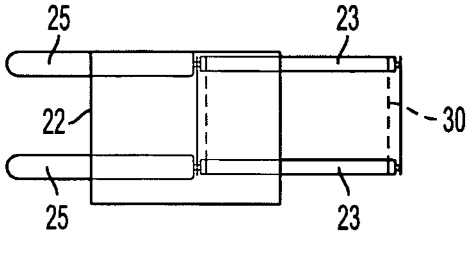
Figure 4E:
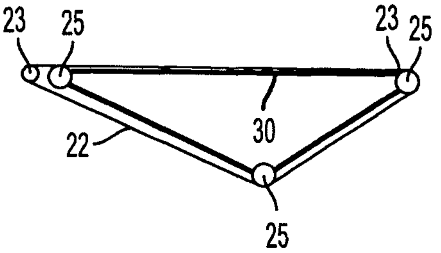
Figure 4F:
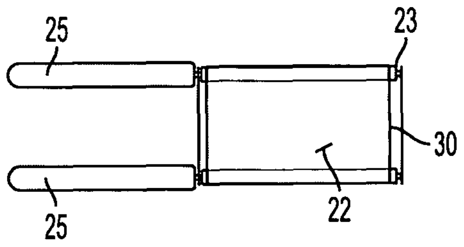
Figure 4G:
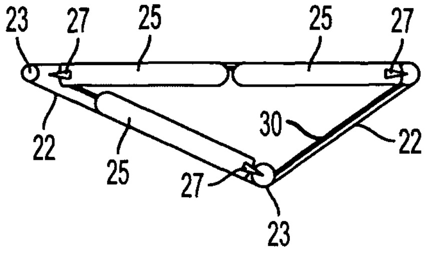
Figure 4H:
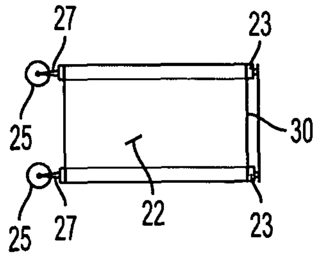

In FIGS. 4A-4H, a step-by-step illustration of a system for replacing belt 22 by the use of the belt installation guides 25 of this invention is shown. Once the old belt 2 (of FIG. 1), 3 (of FIG. 1), 13 (of FIG. 1) or 22 of FIGS. 2 and 3 is removed, in step 1 of FIGS. 4A and 4B, guides 25 are pivoted into service position adjacent rollers 23. In steps 2 and 3 of FIGS. 4C and 4D, belt 22 is loosely draped onto guides 25 and manually tension the upper belt span 26. In step 4, the belt 22 is slid inboard directly onto belt rollers 23. One of the rollers 23 is spring loaded so that it can be moved inwardly when loading to reduce the distance between rollers 23 and 23$^1$. As shown in FIG. 4D, the belt 22 is slid directly off the guides 25 onto the rollers 23. FIG. 4B shows the guides 25 with the belt 22 placed in horizontal alignment with and adjacent to belt receiving rollers 23. Then, after loading is complete, in step 5 of FIGS. 4E and 4F, the belt module tension mechanism or roller 23$^1$ is engaged to increase the distance between rollers 23 and 23$^1$ and thereby increase the tension on belt 22. In step 6 of FIGS. 4G and 4H, installation guides 25 are pivoted back into standby or inactive position. In this embodiment, guides 25 are hinged adjacent rollers 23 using guide hinges 27. While hinges 27 are shown in this embodiment of FIGS. 4A-4H, any suitable roller-guide arrangement can be used. In one embodiment of FIGS. 4G and 4H, the belt guides 25 are mounted on hinged brackets 27 to the belt module 30. The guides 25 are round in cross-section to allow damage free belt contact in any number of contact positions.

In FIG. 5, a belt 22 removal rather than an installation step is shown using the guides 25 of this invention. The belt 22 removal steps are the reverse of those steps of FIGS. 4A-4H. The inboard corner 34 of the installation guide 25 is chamfered or rounded to allow the belt 22 to easily slide onto the guides 25 before sliding the belt 22 fully outboard. Alternatively, the guides 25 do not need to be moved into the extended position for belt removal since the removal step is far easier than installation and less care needs to be taken. If the belt is to be discarded, the protection from damage is not required.

The cross-sectional shape of the guides 25 for clarity are shown to be tubular and elongated with a circular cross-section. However, a circular configuration is not necessary. Circular is advantaged from a commonality perspective but the main requirement is for the surfaces that will be in contact with belt 22 to be without any sharp edges or points that could damage the belt 22. Any shape guide 25 that will accommodate loading a belt 22 using the guides 25 of this invention is included within the scope of this invention.

In FIGS. 6A and 6B, the hinged belt guide 25 shown is an example of a guide with a circular cross-section. Other cross-sections will work as long as the guide surface that comes in contact with the belt is free of sharp corners that can damage the belt 22. The guides 25 are pivoted into position 28 when needed for belt installation and pivoted to the stored position as shown at 29. The hinge 27 shown is a simple sketch for clarity. Any of a number of different suitable hinge designs can be used. A detent or retaining feature may be desired to prevent the guide from moving during belt installation or when in the stored position; however, it may not be necessary if the hinge 27 has sufficient friction to hold the guide in either position. The detent or retaining feature is not shown here. Note that the cross section of guide 25 is slightly larger than the cross section of roller 23.

Figure 7A:
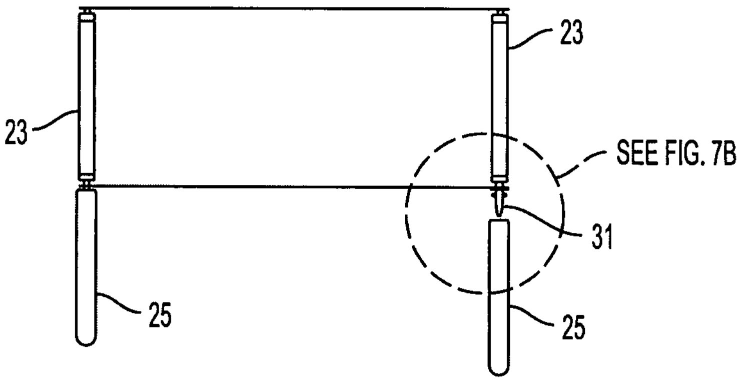
FIGS. 7A and 7B illustrate a top view of a detached embodiment of the belt installation guide of this invention.
Figure 7B:
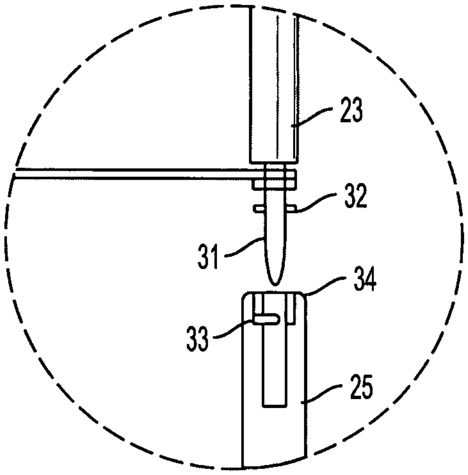

In FIGS. 7A and 7B, the removable belt guide 25 is shown. Other than circular cross-sections will work as long as the guide 25 surface that comes in contact with the belt 22 is free of sharp corners that can damage the belt 22. The guides 25 are installed onto mounting pins 31 for belt installation and removed otherwise. Mounting pins 31 have retaining pins 32 to hold guide 25 in place. The retaining pins 32 will mate with and lock onto extension 33. Note that the cross-section of guide 25 is larger than the cross-section of roller 23. The mounting pin 31 shown is a simple sketch for clarity. Any of a number of different mounting pin designs can be used. A retaining feature (e.g. pin) 31 may be desired to prevent the guide from moving during belt installation; however, it may not be necessary if the mounting pin 31 has sufficient friction to hold the guide 25 in position. In the retaining pin 31 example shown, the belt guide 25 is first installed on to the mounting pin 31 and then rotated to engage the retaining pin 32, thereby locking the belt guide 25 in position. The inboard corner 34 of the installation guide 25 is chamfered or rounded to allow the belt 22 to easily slide onto the guides 25 before sliding the belt 22 fully outboard.

Figure 8A:
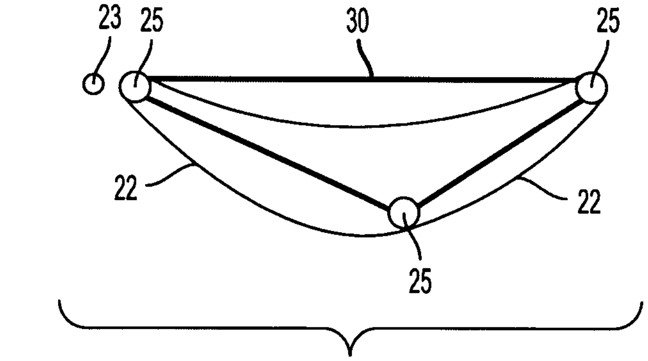
FIG. 8 illustrates an embodiment using handling tubes together with the installation guides to install a belt around rollers.
Figure 8B:
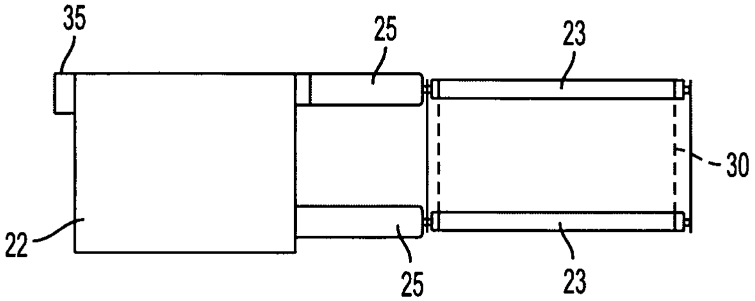

In FIG. 8 an embodiment is shown where a handling tube 35 is used in the installment of belt 22. When belts 22 are shipped to a customer, they are often wrapped around cardboard tubes 35 within the shipping box. An operator may choose to handle a belt 22 by gripping a handling tube 35 in each hand (these are shown in the figures as "handling tubes" 35), and carrying the belt 22 with it draped over each handling tube 35. In this embodiment, the cross section of the handling tubes 35 is greater than the cross section of guides 25. Therefore, the belt guides 25 can be designed so the operator can slide the handling tubes 35 onto the belt guides 25 and then continue installing the belt 22 on rollers 23 as before as shown in FIGS. 4A-4H. After the belt is installed, the handling tubes 35 can be removed and discarded.

When the guides 25 are removable, there must be connection means such as 31, 32 and 33 provided where the guides 25 can be located to easily communicate adjacent to rollers 23. Generally, in all embodiments the cross section of the guides 25 are slightly larger than the cross section of the rollers 23 for easy installation. In FIG. 8 embodiments as noted, the cross section of the guides 25 are slightly smaller than the cross section of handling tubes 35 to allow handling tubes 35 to be slid onto the guides 25.

Thus, provided are embodiments using an installation guide for use in installing or removing a belt(s) from a belt module assembly, including those in an electrostatic marking system. The belt is movably positioned around at least two belt drive or movable rollers. The guide is adapted to be moved adjacent the rollers so as to easily transfer a belt from the guide to the rollers for permanent positioning. The guide has a slightly larger cross sectional configuration and can be in some embodiments have similar cross sectional shape as the rollers, i.e., circles to circles, half moon guide shape to roller circle shape, quarter moon guide to roller circular shapes, etc. As earlier noted, the guide has chamfered or rounded end portions so as not to damage the belt. The guide in one embodiment has an elongated tubular configuration and is enabled to facilitate easy transfer of a belt to a tubular-like movable roller.

In one embodiment, the guide is hinged and positioned adjacent to the rollers and is enabled to be positioned in substantial alignment with the rollers when transferring a belt from the guide to the rollers. The chamfered guide is pivotly located adjacent the rollers and is adapted to be pivoted away from the rollers when not in use.

In another embodiment the guide is detachable from the belt module assembly after belt installation.

One embodiment of this invention specifically provides a belt installation guide used to facilitate transferring a belt in a belt module of an electrostatic marking system from the guide to rollers. The rollers are positioned in the module to support and drive an endless belt when operational. The belt can be a photosensitive belt, an insulating belt or any other type of belt supported around rollers. While at least two rollers are present at least one of the rollers is enabled to drive or move the belt around the rollers in a continuous fashion. The guide is selected from the group consisting of belt module attached guides, guides detached from the belt modules and mixtures thereof. As was earlier noted, the guides are configured so as to accommodate transfer of a belt to the rollers with a minimum of belt damage. The guides also are enabled to be located adjacent and in substantial horizontal alignment with the rollers when installing the belt. In an embodiment, the guides are enabled to be pivoted away from the rollers when the belt installation is completed.

The present guide is used in a method of installing a belt in a belt module of an electrostatic marking or other machine. This installation comprises the following method steps: providing a sufficient number of installation guides to aid belt installation onto all rollers in the belt module; moving the guides into service position with the rollers; loosely drape a belt onto the guides; slide the belt inboard onto the belt from the guides, engage a belt-tightening mechanism to securely attach the belt around the rollers; and in a last step, move the guides away from the rollers to a standby position.

In one embodiment, the last step comprises removing the guides from the belt module. In a second embodiment, the last step comprises pivoting the guides away from operative engagement with the rollers. Also, after transfer of the belt from the guides to the rollers, a tension is exerted upon the belt to thereby secure the belt tightly around the rollers. To minimize any belt damage, the guides have chamfered or rounded end portions to also facilitate easy transfer of the belt to the rollers. In an embodiment, as a first step, the belt module is moved out of the machine. This method is especially useful to replace belts in an electrostatic marking apparatus.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A belt installation guide used in an electrostatic marking system, said guide configured to facilitate transferring a belt in a belt module directly from said guide to rollers, said rollers positioned in said module to support an endless belt when operational;

at least one of said rollers configured to move said belt around said rollers in a continuous fashion, said guide selected from the group consisting of module attached guides, guides detachable from said modules and mixtures thereof, said guides having a larger cross-sectional shape than the rollers and configured so as to accommodate transfer of a belt directly from said guides to said rollers with a minimum of belt damage, said guides configured to be located adjacent and in substantial horizontal alignment with said rollers when installing said belt by directly sliding it inboard entirely off said guides onto said rollers, and configured to be removed from horizontal alignment with said rollers when said installation is completed.

2. The guide of claim 1 wherein said guide is hinged positioned adjacent to said rollers and configured to be positioned in substantial horizontal alignment with said rollers when transferring a belt directly from said guide to said rollers.

3. The guide of claim 1 wherein said guide is pivotly located adjacent said rollers and adapted to be pivoted away from said rollers when not in use.

4. The guide of claim 1 wherein said guide is configured to be detachable from said belt module assembly after the guide is used to install a new belt.

5. The guide of claim 1 wherein said guide is movably attached to said belt module and configured to be pivoted toward and away from said rollers respectively when in use and when inactivated and not in use.

6. A method of installing a belt onto rollers in a belt module of an electrostatic marking machine, said method comprising:

providing an equal number of installation guides as are belt supporting rollers in said module, moving said guides into a horizontal alignment position adjacent with said rollers, loosely draping a belt onto said guides, sliding said belt inboard directly onto said rollers from said guides, engaging a belt-tightening mechanism to securely attach said belt around said rollers, and, in a last step, moving said guides away from alignment with said rollers to a standby position.

7. The method of claim 1 whereby said last step comprises removing said guides from said belt module.

8. The method of claim 1 whereby said last step comprises pivoting said guides away from said horizontal alignment with said rollers.

9. The method of claim 1 whereby said guides have chamfered or rounded end portions to facilitate easy transfer of said belt directly from said guides to said rollers.

* * * * *